Feb. 25, 1964 F. LAA 3,122,294

DEVICE FOR IMPRESSING OR REPRODUCING RECORDINGS

Filed Aug. 27, 1956

INVENTOR
FRIEDRICH LAA
BY [signature]
AGENT

United States Patent Office 3,122,294
Patented Feb. 25, 1964

3,122,294

DEVICE FOR IMPRESSING OR REPRODUCING RECORDINGS

Friedrich Laa, Vienna, Austria, assignor, by mesne assignments, to North American Philips Company, Inc., New York, N.Y., a corporation of Delaware Filed Aug. 27, 1956, Ser. No. 606,511
Claims priority, application Austria Oct. 11, 1955
3 Claims. (Cl. 226—50)

The present invention relates to a recording and reproducing device. More particularly, the invention relates to impressing or reproducing recordings, more especially but not exclusively magnetic recordings, in the form of two or more parallel tracks upon and from tapes, in which the sense of motion of the tape is reversible by means of a driving roll against which the tape is pressed by means of a pressure roller.

When, in such devices, at least two tracks are to be impressed or reproduced, reversion of the sense of motion of the tape is possible by interchanging the two spools after stopping the device upon the tape having been unwound from the supply spool. This method suffers from a limitation in that the interchanging of the spools, even if they are contained in a single holder, is time-consuming, so that recording or reproducing without time interval between the two tracks is ruled out.

Various attempts have been made to mitigate this disadvantage. The time consuming interchanging of the spools may, for example, be avoided by making the sense of rotation of the driving roll reversible so that the tape travels in one sense or in the other. However, also this construction involves a pause, since the sense of rotation of the driving members requires reversal, so that these members must be braked and re-started.

This is avoided in a known construction, in which two separate driving rolls driven in opposite directions each co-act with a pad roller, the axis of the driving rolls and pad rollers extending parallel to each other. One of the pad rollers may at will engage the associated driving roll, thus determining the sense of rotation of the tape. In this construction, the masses of the driving mechanism need not be reversed, hence the passing over from one track to the other occurs practically without time interval. However, the peripheral speeds of the two driving rolls should be perfectly equal, since otherwise a jump in pitch occurs upon reversal. Moreover, the mechanism requires a comparatively large number of component parts. The present invention obviates all the limitations attaching to conventional constructions.

In accordance with the invention, a device for impressing or reproducing recordings, more especially but not exclusively magnetic recordings in the form of two or more parallel tracks on tapes, in which the sense of motion of the tape is reversible and the latter is impelled by means of a driving roll, against which the tape is pressed by means of a pad roller, comprises two pad rollers, either of which can be made to engage the single driving roll which is impelled only in one sense, while the tape is guided between the driving roll and a pad roller by reversing means, for example rollers, after passing over the driving roll with the formation of a loop which does not surround the driving roll, in such manner that, as result of the engagement of one of the pad rollers, the sense of motion of the tape is opposite to the sense of motion when the other pad roller is made to engage the driving roll.

The two tape parts travelling in opposite directions at the driving roll, the heads and the guide means in the proximity of the driving roll and the heads, extend with their surfaces approximately in the same plane.

According to another feature of the invention the change-over required for the magnet heads is effected by changing-over the pad rollers.

The two spools are preferably arranged co-axially adjacent each other and with their axes parallel to the axis of the driving roll, a single driving wheel being provided for driving the two spools in the same sense of rotation through slipping clutches.

In order that the invention may be readily carried into effect, an example will now be described in detail with reference to the accompanying drawings, in which.

Figure 1:
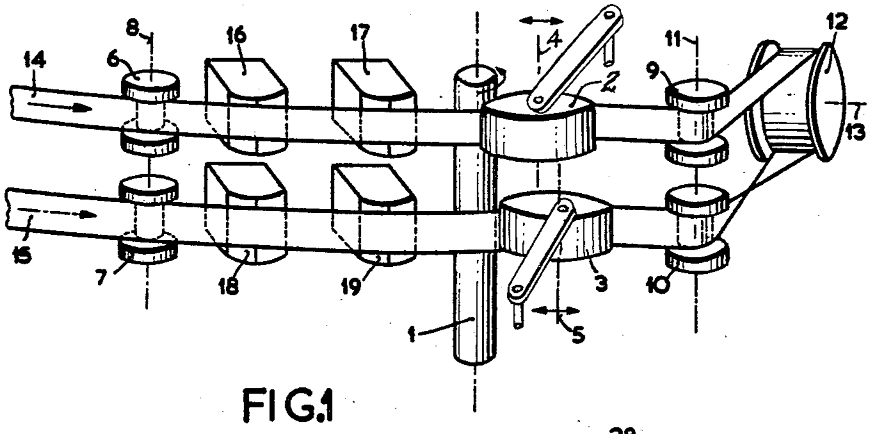
FIG. 1 is a perspective view of an embodiment of a device of the present invention comprising a driving roll with two pad rollers, heads and reversing means, in which all the parts irrelevant to the invention have been omitted.

In the device shown in FIG. 1, a driving roll or roller 1 is associated with two pad rollers 2 and 3. The axes 4 and 5 of the pad rollers 2 and 3, respectively, are displaceable parallel to themselves by means of a reversing mechanism (not shown), so that either the pad roller 2 or the pad roller 3 is in engagement with the driving roll 1. It should be apparent that it is well-known in the art to provide a mechanism for moving pressure rollers on a capstan and selectively removing said rollers from the latter. A suitable structure for the purpose is disclosed in U.S. Patent No. 2,705,639 to Lekas. In the drawing, the pad roller 2 is shown in engagement. According to the sense of rotation of the driving roll 1, as shown in the drawing, a tape portion 14 travels from the supply spool in the direction of the solid line arrow (in FIG. 1 at the left). By means of a guide roller 6 the tape is moved in front of the heads, in the example illustrated past an erase head 16 and a combined record and reproduction head 17. By means of reversing rollers 9, 12, 10 and 7 the tape is guided with the formation of a loop so as to pass once more over the driving roll 1 between the latter and the pad roller 3, the driving roll 1 not being surrounded by the loop. So long as the pad roller 3 does not engage the driving roll 1, the reversal does not affect the movement of the tape. Between the driving roll 1 and the reversing roller 7 the tape passes round another head comprising an erase head 19 and a record and reproduction head 18. During engagement of the pad roller 2 these two heads are non-operative. Finally, the tape portion 15 is wound on the winding up spool.

If the pad rollers 2 and 3 are changed over, so that the roller 3 is brought into engagement and the roller 2 is released, the tape portion 15, the sense of motion of which was so far opposite to the sense of rotation of the driving roll 1, instantly follows the driving roll 1, hence the tape will move in the opposite sense, that is in the direction of the dot-and-dash line arrow (in FIG. 1 at the left).

In the device shown in FIG. 1, the tape engages the driving roll 1 substantially along the same generatrix during record or playback. If the motion of the tape at both sides of the driving roll is such that the motion of the tape portion 15 occurs approximately in the same plane as that of the tape portion 14, this enables a particularly simple construction. The rollers 6 and 7 may be mounted on a common shaft 8, similarly as the rollers 9, 10 on a common shaft 11, while the heads 16, 17, 18, 19 may be mounted on a common support. This device requires only one roller 12 for reversal, the axis 13 of this roller being at right angles to the axes 8 and 11.

Figure 2:
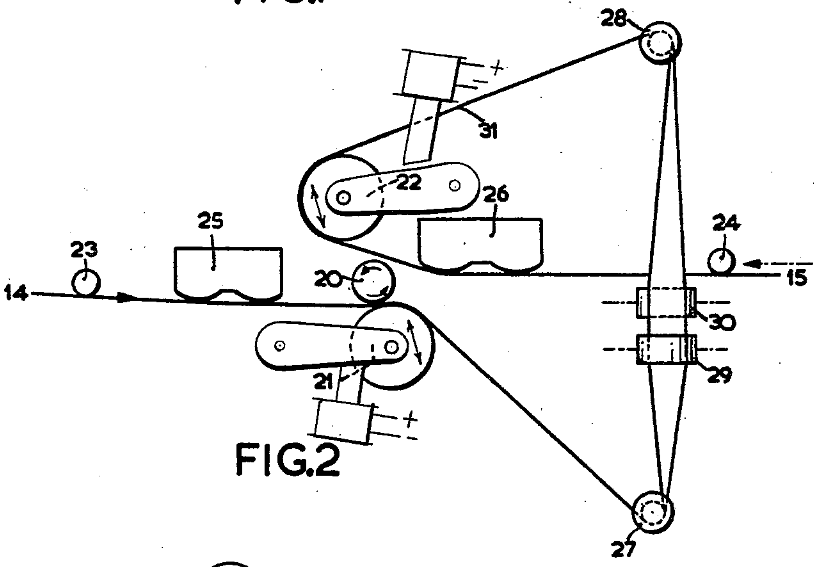
FIG. 2 is a schematic diagram of another embodiment of the device of the present invention in plan view.

In the embodiment shown in FIG. 2, the two pad rollers 21 and 22 are provided one at each side of the driving roll 20. As a result of the motion of the tape through the reversing rollers 27 and 28, which motion substantially corresponds to the tape motion in the construction shown in FIG. 1, the tape 31, which travels in the direction 14, 15 on engagement of the roller 21, will move in the direction 15–14 on engagement of the roller 22, that is, in the reverse sense. Reversible heads are designated by 25 and 26. The reversing pins 23 and 24 assure a correct travel of the tape past the heads.

In order to permit the crossing of the tape required for forming the loop, the parts 21, 23, 25, 27, on the one hand, and 22, 24, 26, 28, on the other hand, extend in different planes. The reversing pins 29 and 30, the first of which extends in the plane 23, 27 and the second in the plane 22, 28, serve to move the tape in a longitudinal direction from one plane into the other with temporary rotation through an angle of 90°.

In the device shown in FIG. 2, the tape is pressed with its emulsion side against the driving roll 20 by the pad roller 21. On engagement of the pad roller 22, however, its other side engages the driving roll 20. This is of no importance for the operation. Otherwise, the tape may once more be turned in the same sense through 90° between the reversing elements 30 and 28, similarly as between the parts 27 and 29. In this case the tape is reversed through 180° in a longitudinal direction and is thus also pressed by the pad roller 22 with its emulsion side against the driving roll 20. In this case, of course, the head 26 must be provided at the other side of the tape.

The construction shown in FIG. 2 is convenient, if the supply spool and the winding spool are arranged one at each side of the driving roll, as is often the case.

The winding spool should wind the tape invariably with a suitable tension and the supply spool should be unwound against a corresponding counter-tension. Without reversing the sense of rotation of parts of the driving mechanism or having to perform other change-over operations, this is achieved in the simplest manner as follows. The ends 14 and 15 of the tape are invariably associated with the same spools. Consistent with the reversal of the sense of motion of the tape, however, the functions of the spools as supply spool and winding-up spool also require reversal. During operation of the pad roller 2 the spool, to which the tape end 14 is connected, is the supply spool, while the spool to which the tape end 15 is connected is the winding-up spool. After changing over to the pad roller 3 just the reverse is true. When driving, through slipping clutches, the two spools simultaneously via a driving spool having a constant sense of rotation in such a direction that the two spools tend to wind up the associated tape end, the spool each time operating as a winding spool will be driven in the correct sense. The drive acting upon the supply spool operates in the wrong direction for unwinding; it operates as a brake and provides for the required counter-tension of the tape.

Figure 3:
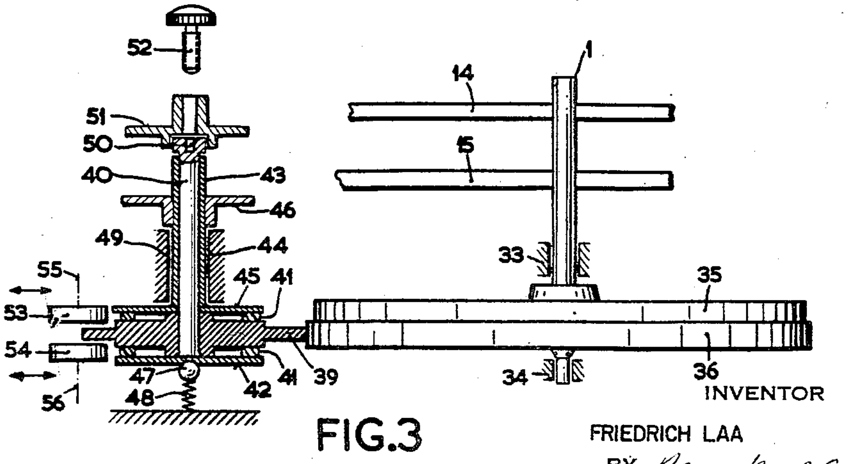
FIG. 3 is a sectional view of an embodiment of a driving device for co-axial spools which may be utilized with the device of the present invention.

These requirements imposed on driving the spools can be satisfied in a very simple manner by arranging the spools co-axially in the embodiment shown in FIG. 3. Jointly with the device shown in FIG. 1 this permits a particularly simple construction of the complete drive, since the motor, which rotates invariably in the same sense, need drive only the flywheel mass and the driving shaft or one driving wheel for the two spool supports. A flywheel mass 35 is journalled with its shaft in bearings 33 and 34 mounted in the support of the device. The shaft 1 acts at the same time as a driving roll over which the two tape parts 14 and 15 of the construction shown in FIG. 1 pass. The flywheel mass 35 is driven in known manner from a motor (not shown). By means of a friction lining 36 the flywheel mass drives a pulley 39 comprising a friction lining 41 at both sides. The pulley 39 is freely rotatable about a shaft 40 extending parallel to the shaft 1. The shaft 40 is in turn rotatable in a hollow shaft 43 which is journalled in a bearing 44 mounted in the support 49 of the whole apparatus. Wheels 45 and 46 are rigidly secured to the hollow shaft 43 and determine the position of the hollow shaft 43 in the bearing 44. A pulley 42 is seated on the shaft 40 and acted upon, through a ball 47, by a spring 48 rested on the support 49 of the device. The pulleys 42 and 45 are thus connected to the friction disc 39 through slipping clutches consisting of linings 41. The two discs have the same sense of rotation.

The pulley 46 is a spool support carrying one spool. The spool support 51 carrying the second spool is driven by the shaft 40 and is detachable. It is secured by means of a screw 52 to the shaft 40 having a screw-thread 50.

The senses of rotation of the shaft 1 and the two spool carriers 46 and 51 rotating in the same sense are opposite to each other. If, consequently, the driving roll 1 rotates in such manner that a tape portion engaging it travels from left to right, for example 14 (FIG. 1), the other tape part 15 which is not engaged, travels from right to left. It is wound on a winding spool provided on the support 46. The spool on the support 51, in this case the supply spool, is required to rotate, while following the tape portion 14, in a sense opposite to that of the drive by the pulley 41 via the slipping clutch 42, so that it is braked.

In order to speed up either of the tape spools the pulleys 42 and 45 respectively may at will be coupled substantially rigidly to the friction wheel 39. For this purpose shafts 56 and 55 are shiftable parallel to each other by means of a change-over device. The friction wheel 39 is so shaped that both the changing-over of the motion of the flywheel mass 35 and the substantially rigid coupling to the pulleys 42 and 45 is enabled by rollers 54 and 53.

Of course, provision may be made of devices lifting the tapes from the heads in known manner during the rapid movement.

Alternatively, the tape may be guided in any arbitrary manner different from FIGS. 1 and 2.

What is claimed is:

1. A recording or reproducing device comprising a tape, a driving roller rotating continuously in one direction only, a pair of spaced pad rollers, and means for moving said pad rollers whereby they alternately and selectively move said tape into driving engagement with said driving roller, one of said pad rollers when so moved causing said tape to be impelled in one direction of movement while the other pad roller when so moved causing said tape to be impelled in the opposite direction of movement.

2. A recording or reproducing device comprising a tape, a driving roller rotating continuously in one direction only, a pair of spaced pad rollers, both located at the same side of said tape and on the same side of said driving roller, and means for moving said pad rollers whereby they alternately and selectively move said tape, one of said pad rollers when so moved causing said tape to be impelled in one direction of movement while the other pad roller when so moved causing said tape to be impelled in the opposite direction of movement.

3. A recording or reproducing device comprising a tape, a driving roller rotating continuously in one direction only, a pair of spaced pad rollers, each of said pad rollers being positioned on the same side of said driving roller and and on the side of the tape opposite to the location of said driving roller, and means for moving said pad rollers whereby they alternately and selectively move said tape into driving engagement with said driving roller, one of said pad rollers when so moved causing said tape to be impelled in one direction of movement while the other pad roller when so moved causing said tape to be impelled in the opposite direction of movement.

References Cited in the file of this patent

UNITED STATES PATENTS

| | | |
|---|---|---|
| 1,499,521 | Hagemann | July 1, 1924 |
| 2,085,383 | Neumann | June 29, 1937 |
| 2,373,107 | Duffy | Apr. 10, 1945 |
| 2,547,464 | Hehr | Apr. 3, 1951 |
| 2,568,601 | Anderson | Sept. 18, 1951 |
| 2,705,639 | Lekas | Apr. 5, 1955 |